US012776666B2

(12) United States Patent
Washiro

(10) Patent No.: US 12,776,666 B2

(45) Date of Patent: Oct. 27, 2026

(54) ANTENNA APPARATUS, WIRELESS POWER TRANSMISSION APPARATUS, AND WIRELESS POWER TRANSMISSION SYSTEM

(71) Applicant: NTT, Inc., Tokyo (JP)

(72) Inventor: Takanori Washiro, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/715,330

(22) PCT Filed: Dec. 21, 2021

(86) PCT No.: PCT/JP2021/047366

§ 371 (c)(1),
(2) Date: May 31, 2024

(87) PCT Pub. No.: WO2023/119429

PCT Pub. Date: Jun. 29, 2023

(65) Prior Publication Data

US 2025/0038576 A1 Jan. 30, 2025

(51) Int. Cl.
*H02J 50/20* (2016.01)
*H02J 50/12* (2016.01)

(52) U.S. Cl.
CPC .............. *H02J 50/20* (2016.02); *H02J 50/12* (2016.02)

(58) Field of Classification Search
CPC ............. H02J 50/00; H02J 50/12; H02J 50/20
See application file for complete search history.

(56) References Cited

U.S. PATENT DOCUMENTS

| | | | | |
|---|---|---|---|---|
| 12,101,020 B2 * | 9/2024 | Huang | H02J 7/90 | |
| 2003/0020661 A1 * | 1/2003 | Sato | H01Q 5/321 | 343/866 |
| 2003/0043759 A1 * | 3/2003 | Yamaguchi | H04B 5/22 | 370/290 |
| 2006/0114159 A1 * | 6/2006 | Yoshikawa | H01Q 7/00 | 343/866 |
| 2008/0117117 A1 * | 5/2008 | Washiro | H01Q 1/2225 | 343/850 |
| 2008/0153416 A1 | 6/2008 | Washiro | | |
| 2009/0096556 A1 * | 4/2009 | Washiro | H01Q 1/36 | 333/24 R |
| 2010/0264871 A1 * | 10/2010 | Matouka | H02J 7/0042 | 320/108 |
| 2011/0080050 A1 * | 4/2011 | Thundat | H02J 50/12 | 307/104 |
| 2012/0212069 A1 * | 8/2012 | Kawano | H02J 50/90 | 307/104 |
| 2013/0002048 A1 * | 1/2013 | Ichikawa | H02J 50/05 | 307/149 |

(Continued)

FOREIGN PATENT DOCUMENTS

| | | | | |
|---|---|---|---|---|
| EP | 1898532 A2 * | 3/2008 | H01P 3/16 |
| JP | 2008-099235 | 4/2008 | |

(Continued)

*Primary Examiner* — Daniel Kessie
(74) *Attorney, Agent, or Firm* — IPUSA, PLLC

(57) ABSTRACT

An antenna apparatus for wireless power transmission, the antenna apparatus includes: two electrodes being perpendicular to each other; a first coil connecting the two electrodes; and a second coil magnetically coupled to the first coil.

3 Claims, 8 Drawing Sheets

(56) References Cited

U.S. PATENT DOCUMENTS

| | | | | |
|---|---|---|---|---|
| 2013/0147427 | A1* | 6/2013 | Polu | H04B 5/26 320/108 |
| 2013/0234533 | A1 | 9/2013 | Kato et al. | |
| 2014/0042822 | A1* | 2/2014 | Nakahara | B60L 53/30 307/104 |
| 2014/0175896 | A1* | 6/2014 | Suzuki | H02J 50/12 307/104 |
| 2014/0239738 | A1* | 8/2014 | Koyama | H02J 50/05 252/511 |
| 2014/0252865 | A1* | 9/2014 | Corum | G01S 13/88 307/104 |
| 2014/0252886 | A1 | 9/2014 | Corum et al. | |
| 2014/0295703 | A1* | 10/2014 | Nagashima | H01R 24/52 29/876 |
| 2014/0339915 | A1* | 11/2014 | Kanno | B60L 53/51 307/104 |
| 2015/0130407 | A1* | 5/2015 | Ni | H02J 50/50 320/108 |
| 2015/0249360 | A1* | 9/2015 | Ichikawa | H02J 50/70 320/108 |
| 2015/0287527 | A1* | 10/2015 | Kasar | H02J 50/90 307/104 |
| 2015/0366434 | A1* | 12/2015 | Tsuruta | A61B 1/005 606/34 |
| 2016/0028248 | A1* | 1/2016 | Asanuma | H02J 50/90 307/104 |
| 2016/0356652 | A1* | 12/2016 | Yun | G01J 5/0802 |
| 2017/0103850 | A1* | 4/2017 | Furiya | H01F 29/12 |
| 2017/0150618 | A1* | 5/2017 | Choi | G06F 1/1626 |
| 2017/0187238 | A1* | 6/2017 | Chong | H02J 50/12 |
| 2017/0207668 | A1* | 7/2017 | Kanno | B60L 53/36 |
| 2017/0324253 | A1* | 11/2017 | Park | H04B 5/72 |
| 2017/0330772 | A1* | 11/2017 | Yamazawa | H01F 21/005 |
| 2017/0366047 | A1* | 12/2017 | Matsumoto | H02J 50/12 |
| 2018/0076668 | A1* | 3/2018 | Parimi | H02J 50/40 |
| 2019/0214734 | A1* | 7/2019 | Bien | H02J 50/20 |
| 2022/0131417 | A1* | 4/2022 | Yun | H02J 50/005 |
| 2022/0320904 | A1* | 10/2022 | Li | H01F 27/28 |
| 2022/0352756 | A1* | 11/2022 | Li | H02J 7/0047 |
| 2024/0250563 | A1* | 7/2024 | Farkas | H01F 27/2823 |

FOREIGN PATENT DOCUMENTS

| | | |
|---|---|---|
| JP | 2012-060850 | 3/2012 |
| JP | 2016-509468 | 3/2016 |
| WO | 2012/086280 | 6/2012 |

* cited by examiner

ANTENNA APPARATUS, WIRELESS POWER TRANSMISSION APPARATUS, AND WIRELESS POWER TRANSMISSION SYSTEM

TECHNICAL FIELD

The present invention relates to a technique for wirelessly transmitting power. More particularly, the present invention relates to a technique that is effective in wirelessly transmitting power over a relatively long distance of several meters or more without using a cable.

BACKGROUND ART

Methods for transmitting power wirelessly between two points where it is difficult to lay a power-supply cable have been proposed heretofore, and examples of existing techniques include: (1) a method in which a laser is used; (2) a method in which microwaves are used; (3) a method in which magnetic field resonance or electric field resonance is used; and (4) a method in which electromagnetic induction is used.

For example, PTL 1 discloses a method of (3), in which magnetic field resonance or electric field resonance is used.

CITATION LIST

Patent Literature

[PTL 1] JP-A-2012-60850

SUMMARY OF INVENTION

Technical Problem

In the existing method of (1), in which a laser is used to transmit power wirelessly between two points, power is transmitted using a straight beam. Therefore, power cannot be transmitted unless the receiving party is in a line-of-sight position. There are other restrictions on use as well. For example, there must be no obstacles between the laser device and the receiving party to which power is transmitted, it is necessary to track the laser beam in accordance with the receiving party's location when the receiving party moves, and so on.

In the method of (2), in which microwaves are used, microwaves (radio waves) diffuse while propagating in space. Therefore, transmit efficiency decreases as the distance increases.

In the method of (3), in which magnetic field resonance or electric field resonance is used, the resonance phenomenon caused by the resonance of antennas on both the power transmitting side and the power receiving side is used. Therefore, when the distance between the antennas changes (that is, whether the distance between the antennas is too short or too long), the conditions for resonance are no longer satisfied, and the efficiency of transmit drops.

In the method of (4), in which electromagnetic induction is used, since the distance of transmit is short, power can be transmitted only between locations that are so close and nearly in contact with each other.

The present invention has been made in view of the foregoing, and an object of the present invention is to provide a technique for performing wireless power transmission more efficiently than is possible with existing techniques.

Solution to Problem

According to the technique disclosed herein, an antenna apparatus for wireless power transmission including: two electrodes being perpendicular to each other; a first coil connecting the two electrodes; and a second coil magnetically coupled to the first coil, is provided.

Advantageous Effects of Invention

According to the technique disclosed herein, a technique for performing wireless power transmission more efficiently than is possible with existing techniques is provided.

DESCRIPTION OF EMBODIMENTS

An embodiment (this embodiment) of the present invention will be described below with reference to the drawings. The embodiment to be described below is one example, and embodiments to which the present invention can be applied are not limited to the following embodiment.

Overview of Embodiment

In this embodiment, wireless power transmission in which surface waves are used is performed. That is to say, energy emitted from a power transmitting antenna is wirelessly transmitted to a power receiving antenna in the form of surface waves. Antennas for both transmitting power and receiving power can use antennas of the same shape for transmitting and receiving surface waves. Note that an antenna may be referred to as an "antenna apparatus".

Surface waves are electromagnetic waves that propagate in a two-dimensional plane along an interface between two media with different dielectric constants. Since the power (energy) of surface waves is concentrated near the interface and does not spread in the height direction in three dimensions, power can be transmitted with high efficiency between antennas near the interface.

There are two media with different dielectric constants that form an interface where surface waves propagate: "air and metal floor", "air and ground", and "air and sea surface". For example, power can be efficiently wirelessly transmitted between devices placed on floors covered with metal panels in offices, factories, and the like.

Figure 1:
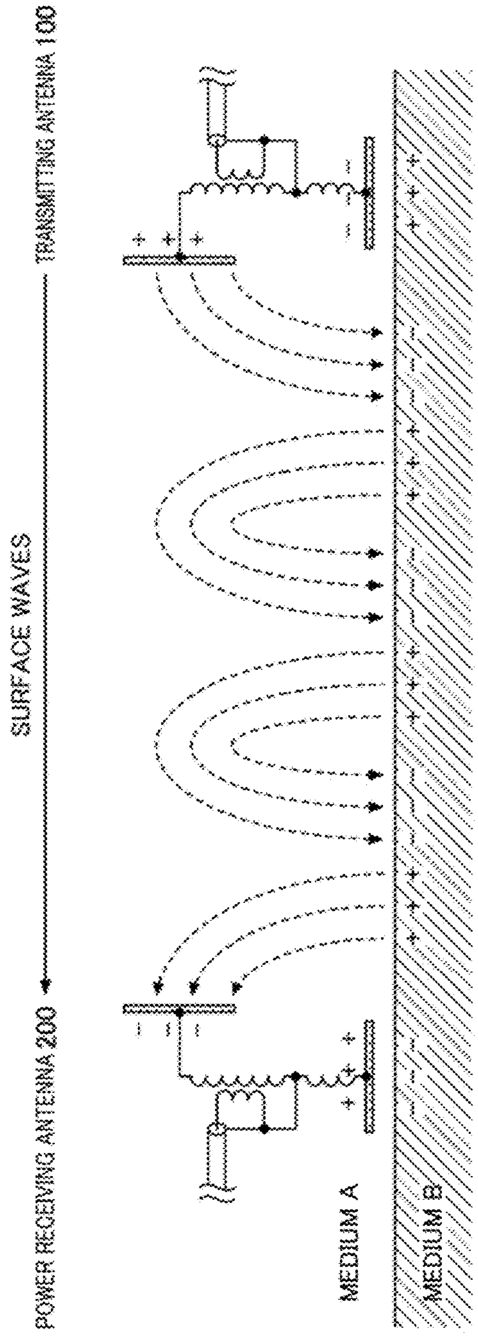
FIG. 1 is a diagram illustrating an example of a system that performs wireless power transmission using surface waves.

FIG. 1 shows an example structure of a system which performs wireless power transmission using surface waves. As shown in FIG. 1, a power transmitting antenna 100 and a power receiving antenna 200, which are antennas having the same shape for transmitting and receiving surface waves, are provided. In the example of FIG. 1, surface waves propagate along the interface between medium A and medium B, which are two media having different dielectric constants, thereby transmitting power wirelessly from the power transmitting antenna 100 to the power receiving antenna 200.

A structure and the like of the antenna will be described in detail below using Examples 1 to 3.

Example 1

Generally, when an antenna resonates, both radio waves emitted into a three-dimensional space and surface waves emitted into a two-dimensional plane can be generated. In order to increase the efficiency of wireless power transmit on a two-dimensional plane, it is preferable for the antenna to emit less radio waves into a three-dimensional space and emit more surface waves on a two-dimensional plane.

Figure 2:
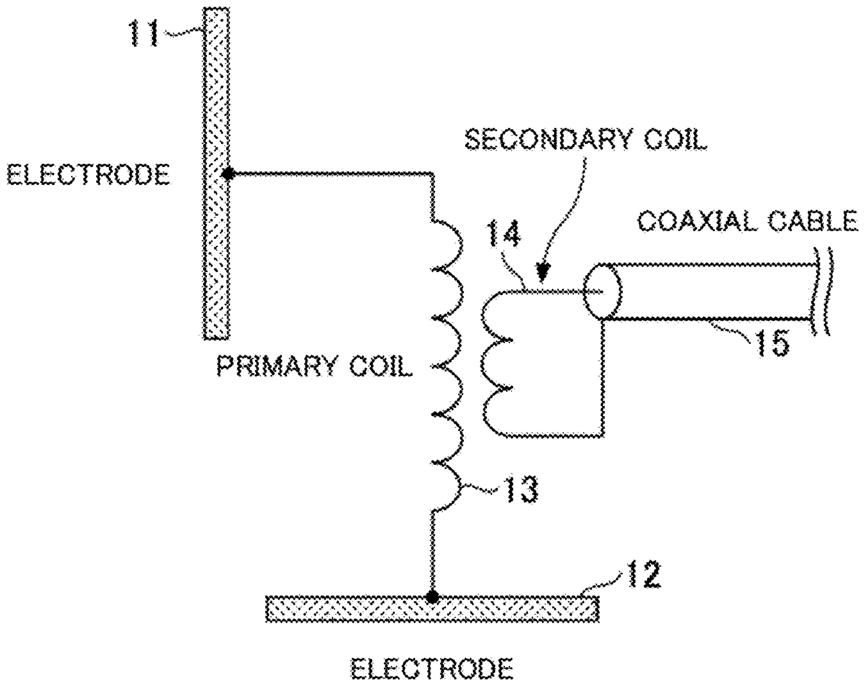
FIG. 2 is a diagram illustrating a structure of an antenna apparatus according to Example 1.

In this embodiment, the structure shown in FIG. 2 implements an antenna that reduces the emission of radio waves to a three-dimensional space and increases emission of surface waves on a two-dimensional plane.

FIG. 2 is a diagram illustrating a structure of an antenna according to Example 1. FIG. 2 shows a cross-sectional image of the antenna cut along a plane perpendicular to the electrode plane.

As shown in FIG. 2, the antenna of Example 1 includes an electrode 11 for emitting surface waves to a medium (medium A) in front, and an electrode 12 for connecting to the floor (medium B).

Since the electrode 12 is strongly connected to the medium B of the floor, the electrode 12 is installed parallel to the floor to face the floor. Since the electrode 11 emits a surface wave in a direction parallel to the interface, the electrode 11 is installed to face a direction parallel to the interface (that is, perpendicular to the electrode 12 parallel to the floor). Note that the terms “parallel” and “perpendicular” in this embodiment may not be strictly a “parallel” state and a “perpendicular” state. For example, a direction deviating from a “parallel” state in a range of a certain threshold value may be regarded as a “parallel” state. Also, a direction deviating from a “perpendicular” state in a range of a certain threshold value may be regarded as a “perpendicular” state.

The electrode 11 and the electrode 12 are connected using a coil (primary coil 13). Also, a secondary coil 14 connected to a coaxial cable 15 is provided.

The electrodes 11 and 12 and the primary coil 13 constitute one resonator and have a unique resonance frequency. The sizes of the electrodes and the coils are adjusted so that the resonance frequency of this resonator matches the frequency of the high-frequency power supply to be transmitted. Note that the term “match” need not refer to an exact “match”. For example, a state deviating from a “matching” state in a range of a certain threshold value may be regarded as a “matching” state.

Figure 3:
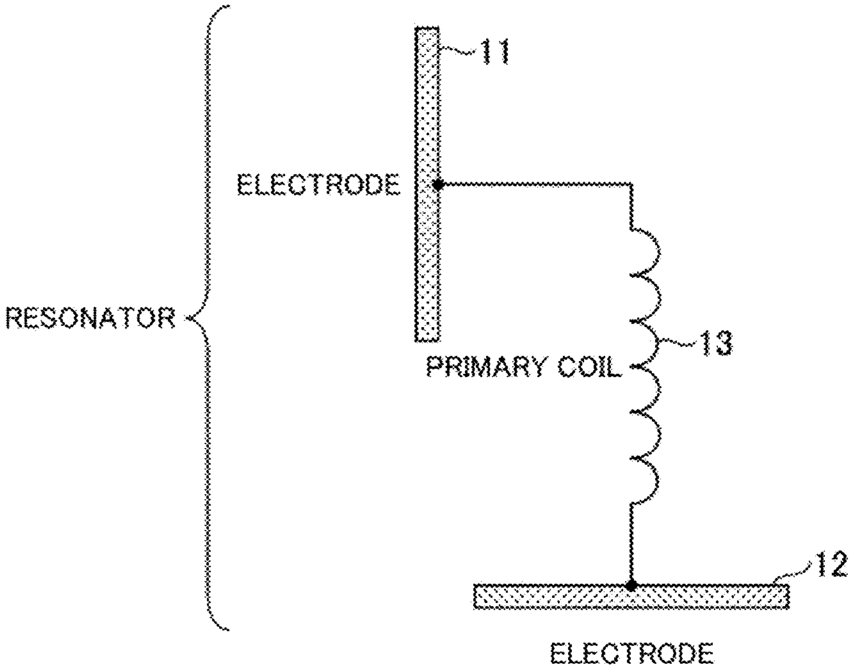
FIG. 3 is a diagram illustrating a structure of a resonator.

FIG. 3 shows a resonator formed with the electrode 11, the electrode 12, and the primary coil 13. When the resonator shown in FIG. 3 resonates, charge is accumulated in the electrodes 11 and 12, and the voltage amplitude between the electrodes 11 and 12 increases, creating a strong electric field around the electrodes.

Furthermore, a large current flows through the primary coil 13 and the amplitude of the current becomes maximum at the center of the primary coil 13.

At this time, when the primary coil 13 and the secondary coil 14 are magnetically coupled without contact, power can be input to or extracted from the resonator without affecting the resonance frequency of the resonator.

Figure 4:
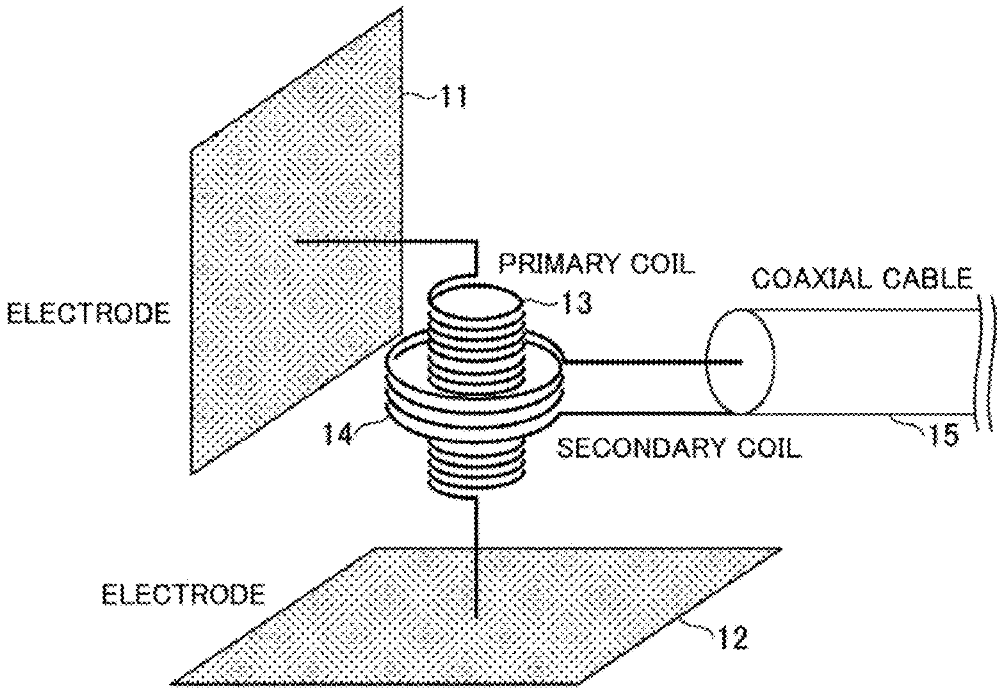
FIG. 4 is a diagram illustrating a structure of an antenna apparatus according to Example 1.

An example of disposition of the primary coil 13 and the secondary coil 14 is shown in FIG. 4. In the example shown in FIG. 4, when the secondary coil 14 is wound over the primary coil 13, power can be input/output to/from the resonator.

Figure 5:
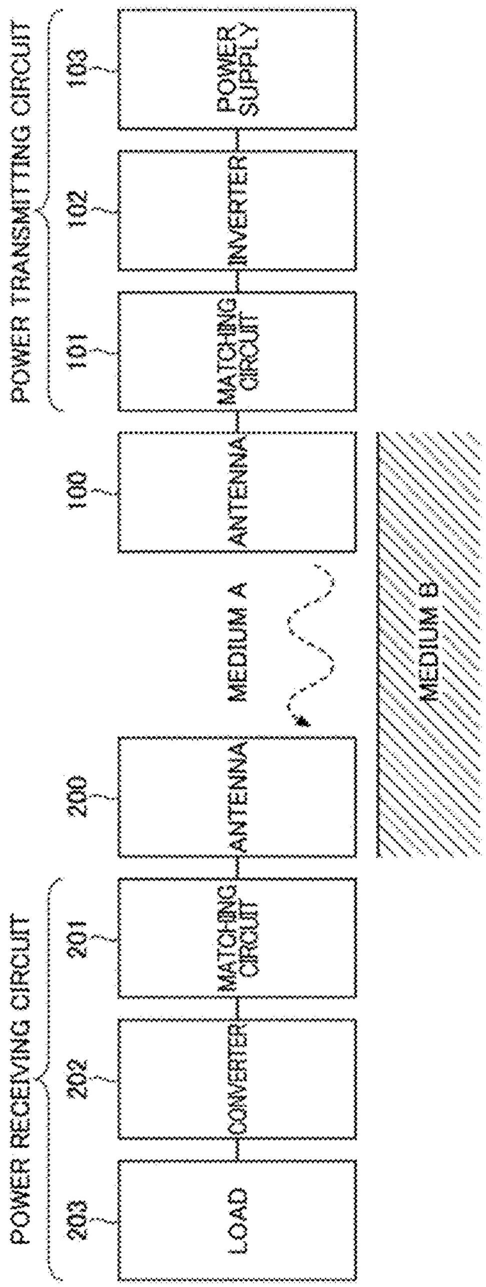
FIG. 5 is a diagram illustrating a structure of a wireless power transmission system according to Example 1

The antenna is connected to a power transmitting circuit or a power receiving circuit via a transmission line such as a coaxial cable 15 or the like. FIG. 5 shows an example structure in which an antenna 100 is connected to a power transmission circuit and an antenna 200 is connected to a power receiving circuit. Note that both the power transmitting circuit and the power receiving circuit may be referred to as a “power transmitting and receiving circuit”. Furthermore, a device that includes an antenna and a power transmission/reception circuit may be referred to as a “wireless power transmission apparatus”. Also, as shown in FIG. 5, a system including a plurality of wireless power transmission apparatuses may be referred to as a “wireless power transmission system”.

As shown in FIG. 5, the power transmission circuit has a matching circuit 101, an inverter 102, and a power supply 103. The power receiving circuit has a matching circuit 201, a converter 202, and a load 203.

The matching circuit 101 of the power transmission circuit performs impedance matching between the antenna 100 and the inverter 102. The matching circuit 201 of the power receiving circuit performs impedance matching between the antenna 200 and the converter 202. The matching circuits 101 and 201 can suppress reflection and improve the efficiency of transmit of the entire wireless power transmission system.

Example 2

Figure 6:
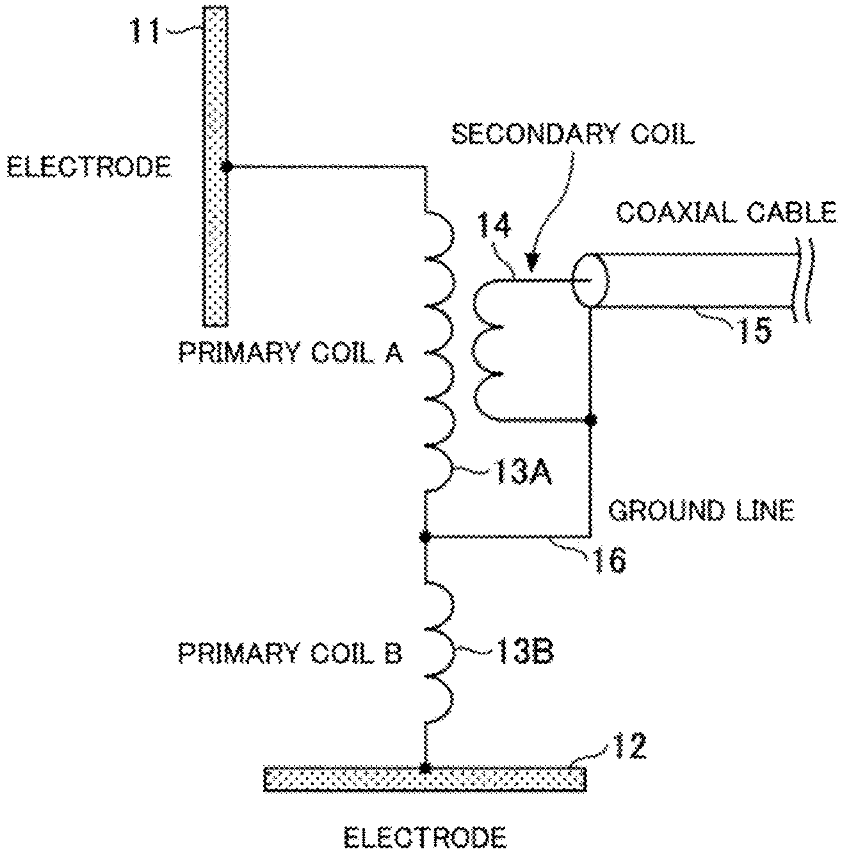
FIG. 6 is a diagram illustrating a structure of an antenna apparatus according to Example 2.

Example 2 will be described below. When a resonator inside an antenna resonates, the electrodes at both ends become “antinodes of resonance with maximum potential amplitude” and the vicinity of the center of the resonator becomes “resonance node with minimum potential amplitude”. Therefore, as shown in FIG. 6, a ground line 16, which is a coaxial cable for feeding power, may be connected to a position where the potential is zero and becomes a resonance node (position between a primary coil 13A and a primary coil 13B).

Figure 7:
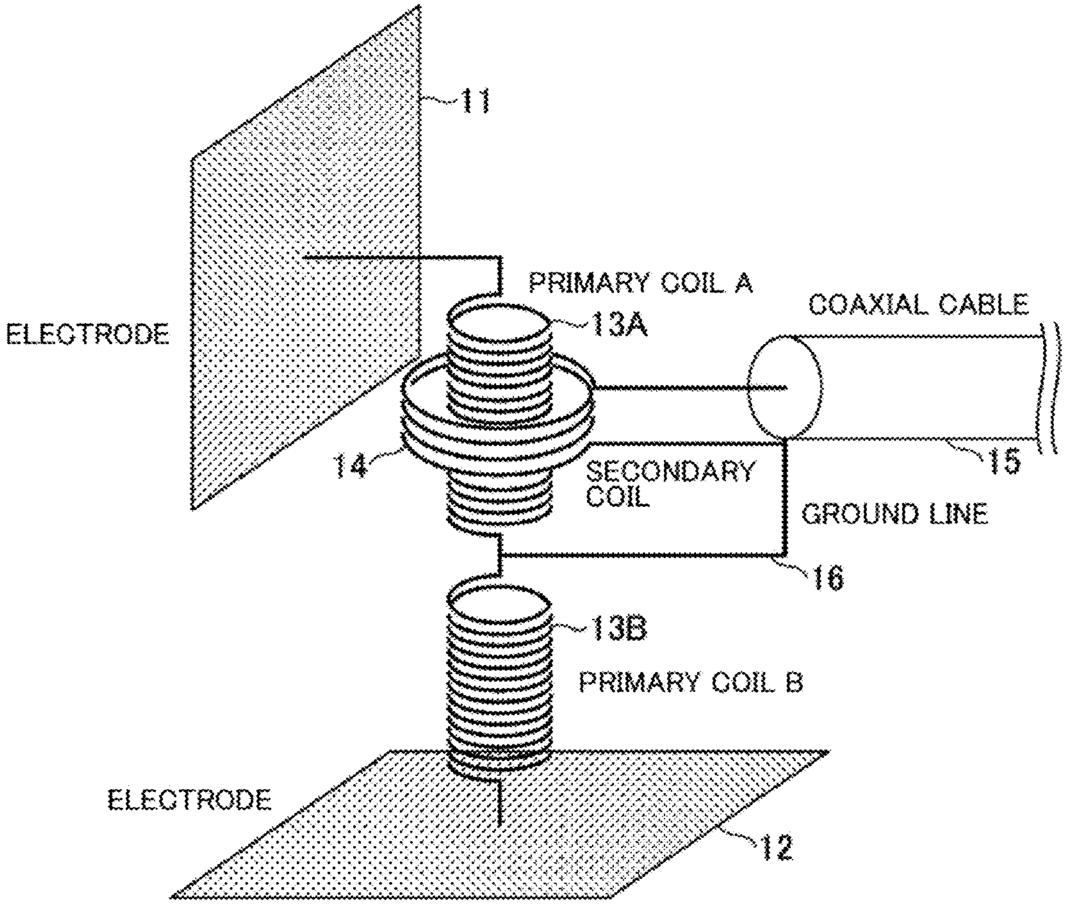
FIG. 7 is a diagram illustrating a structure of the antenna apparatus according to Example 2.

Thus, the ground potentials of the resonator and the power transmission/reception circuit are matched and the efficiency of transmit is improved. FIG. 7 shows a diagram of the antenna shown in FIG. 6 when viewed obliquely from above.

Example 3

Example 3 will be described below. The antenna used in Example 3 may be the antenna described in Example 1 or the antenna described in Example 2.

A wireless power transmission technique in which surface waves are used can confine power in a two-dimensional plane without spreading it in the three-dimensional height direction. Thus, the wireless power transmission technique has the advantage of higher transmit efficiency than existing wireless power transmission techniques that transmit power in three-dimensional space.

Furthermore, since surface waves propagate along the interface between two media with different dielectric constants, there is an advantage that the power transmission path can be bent along the interface if the interface is curved.

Figure 8:
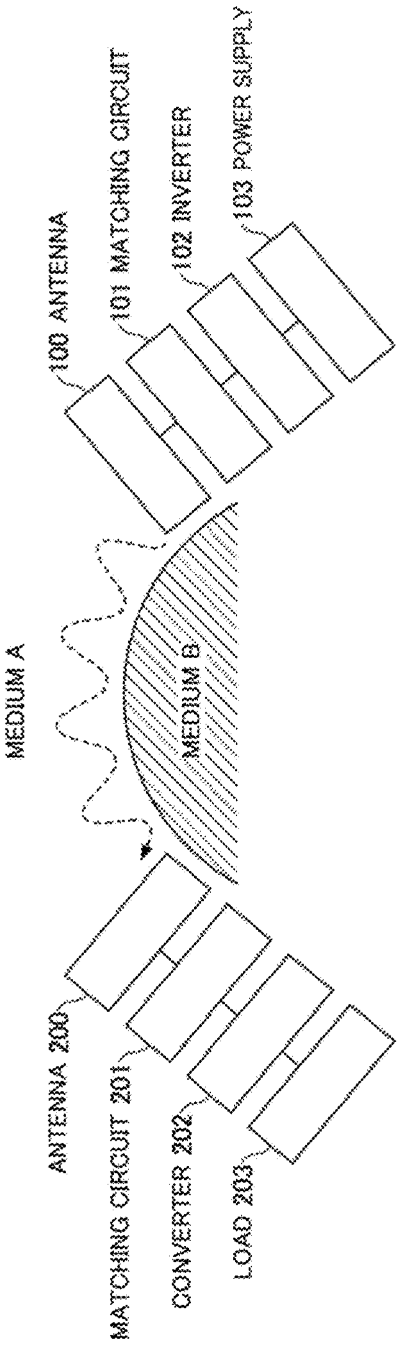
FIG. 8 is a diagram illustrating a structure of a wireless power transmission system according to Example 3.

FIG. 8 shows an example of a structure of a system which utilizes the advantage of being able to bend the power transmission path along the interface. The components of the system are the same as those shown in FIG. 5. The example of FIG. 8 shows a case in which the receiving party to which a user wants to transmit power is on the horizon or beyond the horizon line and cannot be seen from the user. Even in such a case, it is possible to transmit power from the antenna 100 to the antenna 200 which is not possible with existing wireless power transmission techniques that use lasers or microwaves.

Regarding Summary and Effects of Embodiment

As described above, in this embodiment, an antenna apparatus for wireless power transmission is configured so that the antenna apparatus includes two electrodes being perpendicular to each other, a coil which connects these, and another coil magnetically coupled to the coil and is connected to the power transmission/reception circuit via the other coil.

Also, the two electrodes and the coil connecting these form a resonator that resonates at the output frequency of the power transmission circuit for wireless power transmission. The resonator and the ground of the power transmission/reception circuit may be connected using a ground line.

According to the antenna apparatus configured as described above, the emission of radio waves to a three-dimensional space can be suppressed, and surface waves propagating on a two-dimensional plane can be efficiently transmitted and received.

Also, since power is confined on a two-dimensional plane and transmitted, power can be transmitted more efficiently than existing wireless power transmission techniques that emit power in three-dimensional spatial directions.

Furthermore, even if the interface through which the surface waves propagate is curved, power also bends as it propagates along the interface. Thus, power can be transmitted even if the receiving party is not directly visible.

SUPPLEMENTARY NOTE

This specification discloses at least an antenna apparatus, a wireless power transmission apparatus, and a wireless power transmission system according to the following items.

Item 1

An antenna apparatus for wireless power transmission, the antenna apparatus including:

two electrodes being perpendicular to each other;

a first coil connecting the two electrodes; and a second coil magnetically coupled to the first coil.

Item 2

The antenna apparatus of item 1, wherein the two electrodes and the first coil constitute a resonator that resonates at an output frequency of a power transmission/reception circuit for wireless power transmission.

Item 3

The antenna apparatus of item 2 wherein the resonator and the ground of the power transmission/reception circuit are connected using a ground line.

Item 4

The antenna apparatus of any one of items 1 to 3, wherein the antenna apparatus transmits power using surface waves or receives power transmitted using surface waves.

Item 5

A wireless power transmission apparatus comprising:

the antenna apparatus of any one of items 1 to 4; and a power transmission/reception circuit connected to the antenna apparatus via the second coil in the antenna apparatus.

Item 6

A wireless power transmission system comprising:

a wireless power transmission apparatus on the power transmission side, which is the wireless power transmission apparatus of item 5; and a wireless power transmission apparatus on a power receiving side which is the wireless power transmission apparatus of item 5.

Although the present embodiment has been described above, the present invention is not limited to such a specific embodiment, and various modifications and changes are possible within the scope of the gist of the invention described in the claims.

REFERENCE SIGNS LIST

11 Electrode
12 Electrode
13 Primary coil
14 Secondary coil
15 Coaxial cable
16 Ground line
100 Antenna
101 Matching circuit
102 Inverter
103 Power supply
200 Antenna
201 Matching circuit
202 Converter
203 Load

The invention claimed is:

1. An antenna apparatus configured to transmit or receive power via a surface wave propagating along an interface between two media having different dielectric constants, the antenna apparatus comprising:

two electrodes including a first electrode and a second electrode, the first electrode disposed perpendicular to one of the two media, and the second electrode disposed parallel to the one of the two media;

a first coil connecting the two electrodes; and a second coil magnetically coupled to the first coil, wherein the two electrodes and the first coil constitute a resonator that resonates at an output frequency of a power transmission/reception circuit for wireless power transmission, a resonance node of the resonator is connected to a ground of the power transmission/reception circuit using a ground line, the first coil includes a first-side portion and a second-side portion, the first-side portion located closer to the first electrode, the second-side portion located closer to the second electrode, and the resonance node of the resonator is located at a connecting portion connecting the first-side portion and the second-side portion of the first coil.

2. A wireless power transmission apparatus comprising:

the antenna apparatus of claim 1; and the power transmission/reception circuit connected to the antenna apparatus via the second coil of the antenna apparatus.

3. A wireless power transmission system comprising:

a wireless power transmission apparatus on a power transmission side, which is the wireless power transmission apparatus of claim 2; and another wireless power transmission apparatus on a power receiving side, which is the wireless power transmission apparatus of claim 2.

* * * * *